July 19, 1960   H. G. FREEMAN ET AL   2,945,666
BALL VALVE
Filed Feb. 14, 1958   2 Sheets-Sheet 1
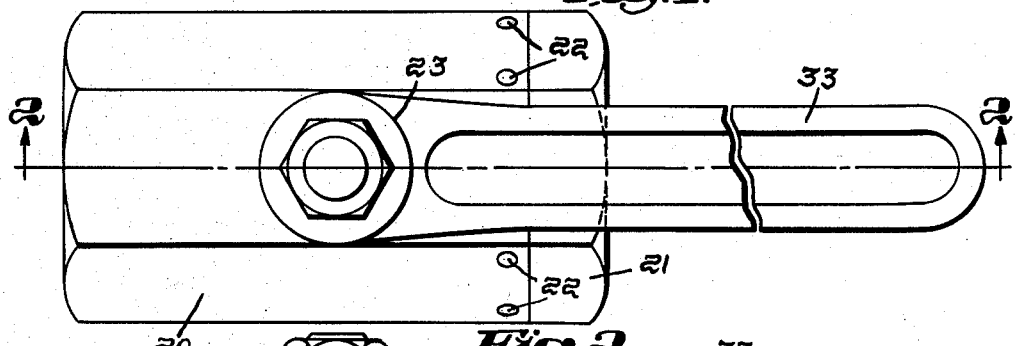
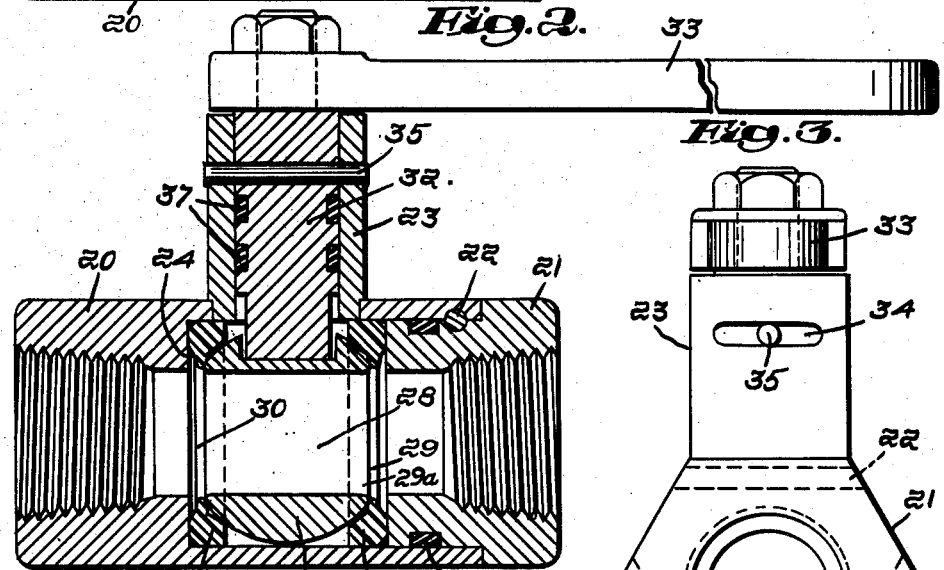
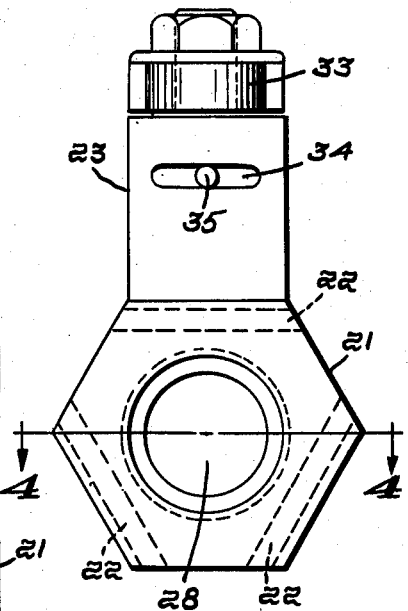
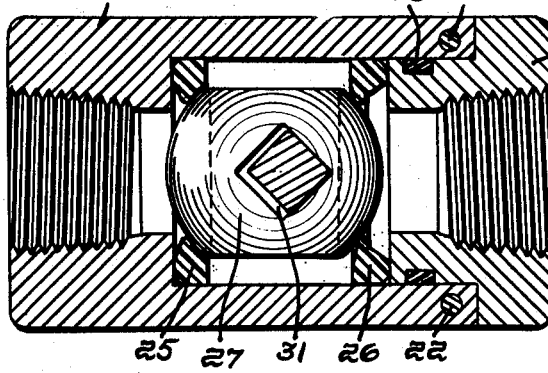
Inventors:
Howard G. Freeman,
Oscar R. Vaudreuil,
by Arthur D Thomson Attorney

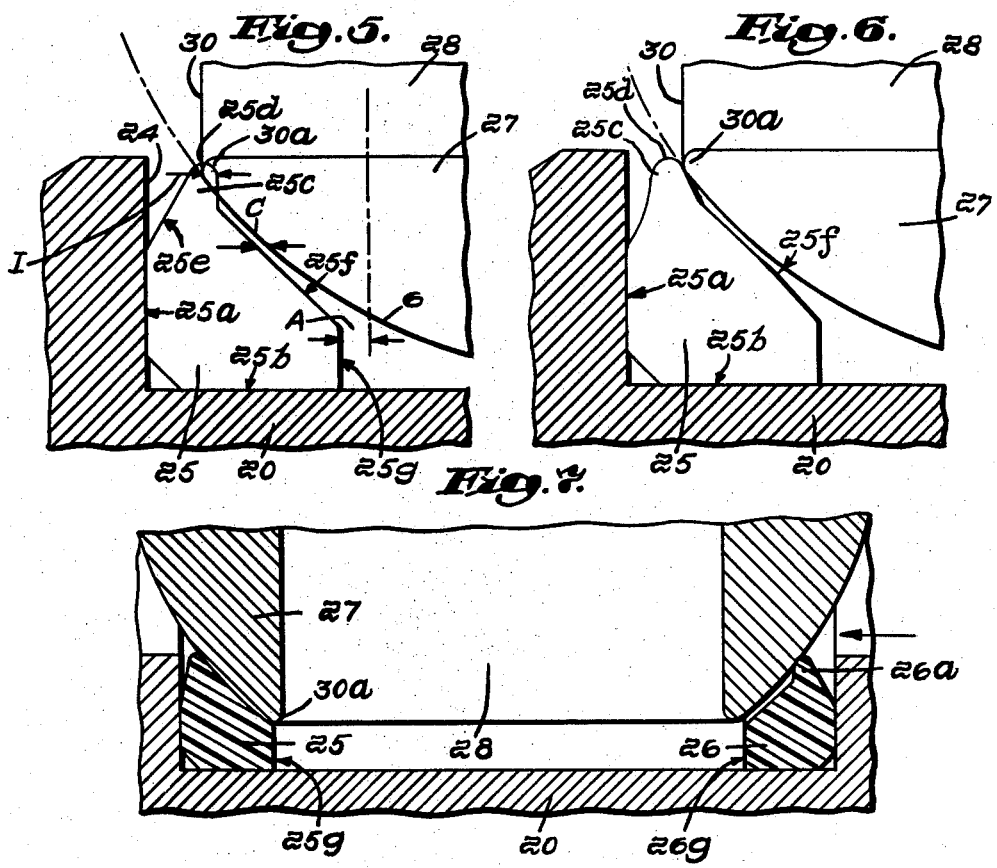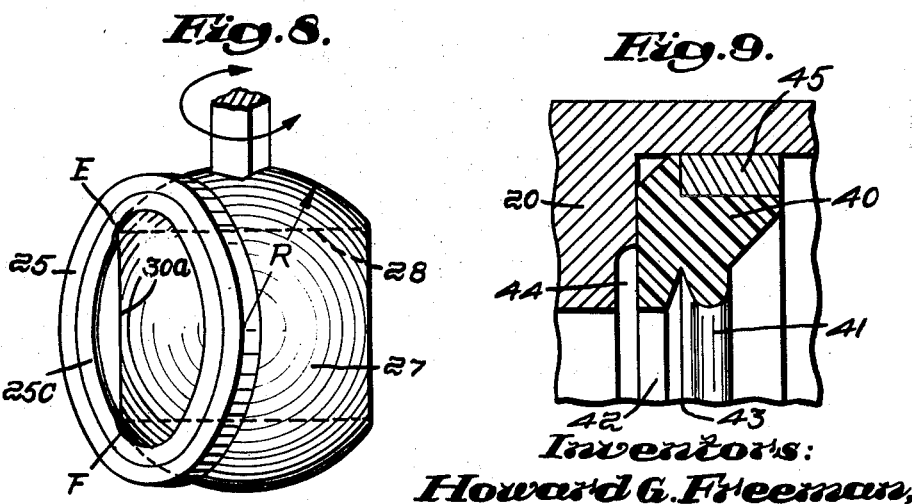

United States Patent Office 2,945,666
Patented July 19, 1960

2,945,666

BALL VALVE

Howard G. Freeman, Worcester, and Oscar R. Vaudreuil, Leicester, Mass., assignors to Jamesbury Corp., Worcester, Mass., a corporation of Massachusetts Filed Feb. 14, 1958, Ser. No. 715,372

10 Claims. (Cl. 251—172)

This invention relates to ball valves, and more particularly to sealing elements for the valve seat, the present application being a continuation-in-part of copending application Serial No. 436,188, filed June 11, 1954, now abandoned. Ball valves for handling corrosive or radioactive materials and fluids at high temperature, present an especially difficult sealing problem. It is essential to form a perfectly tight seal between the ball and the seat, usually on both the upstream and the downstream side, and yet the valve must open and close easily. Furthermore, if the valves are installed in dangerous or inaccessible locations, shutting down the equipment for repairs on a valve or replacement of a valve seat may be extremely costly. The valve seats must, therefore, be constructed to withstand long wear without leaking.

The principal object of this invention is to produce a valve seat construction which provides maximum security against leakage, which reduces wear on the seats to a minimum, and which ensures smooth opening and closing of the valves. Another object is to provide a seat construction with is adapted not only for seats made of the flexible rubber-like materials ordinarily used, but also for seats made of hard plastics or even metals, where extreme temperature or load conditions preclude the use of rubber-like materials.

The valve here disclosed includes a ball, a valve casing, a stem for controlling the ball, and a bonnet, all of which may be of generally conventional construction. Preferably a pair of seating rings, one on the upstream side and one on the downstream side of the ball, are employed as the sealing elements. These rings have lips which are free to deflect to a greater or less extent, depending on the seat material and the load conditions, and which are shaped and proportioned in such a manner as to engage the ball at an angle with respect to the direction of flow. Furthermore, both the port of the ball and the lips have rounded rims disposed in a specific relationship, as will be later described in detail so that the edge of the port cannot cut into the lip when the valve is being opened or closed. Other advantages and novel features of the valve will be apparent from the description which follows.

In the drawings illustrating the invention:

Fig. 1 is a plan view of a valve constructed according to the invention;

Fig. 2 is a cross-section taken along line 2—2 of Fig. 1;

Fig. 3 is an end view of the valve;

Fig. 4 is a cross-section taken along line 4—4 of Fig. 3;

Fig. 5 is a fragmentary schematic view in the region of the valve seat showing the relative dimensions of the seat and port as the parts are manufactured;

Fig. 6 is a fragmentary cross-section in the region of the valve seat after the valve has been assembled;

Fig. 7 is an enlarged fragmentary cross-section showing the ball closed under pressure;

Fig. 8 is a schematic perspective view illustrating the action of the seat as the valve is opening or closing; and Fig. 9 is a fragmentary cross-section of a modified form of seat.

The casing of the valve consists of a pair of internally threaded tubular pipe fittings 20 and 21 which are secured together by pins 22. The casing is adapted to be connected into a pipe line in the usual manner by threading the pipe into either end. A valve bonnet 23 projects from one side of the casing. The fitting 20 has an internal shoulder 24. The two sealing rings 25 and 26, which form the valve seats, are mounted on shoulder 24 and the inner end of fitting 21, respectively. The ball 27 is mounted between the rings and has a passage 28 connecting ports 29 and 30 which are aligned with the interior openings of fittings 20 and 21 when the valve is open.

The ball 27 has a square recess 31 in which the squared lower end of the stem 32 is received. The stem extends out through bonnet 23, and a handle 33 is mounted on the outer end. The bonnet has a pair of circumferential slots 34, and a pin 35 which passes through the stem, and these slots serve both to carry any axial load on the stem and to limit the travel of the handle to a quarter turn. The junction of the fittings 20 and 21 is sealed by an O-ring and the stem is sealed by O-rings 37.

The construction and arrangement of the valve seats is illustrated in detail in Figs. 5 through 7. The ring 25 has a flat face 25a which seats against shoulder 24, and a cylindrical face 25b which engages the inside surface of fitting 20. The part of the ring which first engages the ball is a free standing interior lip 25c having a rounded inner surface 25d, and an oblique surface 25e. Leading to the lip is an oblique surface 25f on which the ball will eventually be seated when the lip is deflected sufficiently under load. The lip 25c is designed to have a certain amount of interference with respect to the ball surface when the ball is installed in the valve.

The ball itself has a rounded rim 30a around port 30 preferably of about the same radius as the lip 25c of the seating ring. The relative proportion and arrangement for which the ball and seating ring are designed are illustrated in Fig. 5.

The outlines of the rim 30a and portion 25d overlap when the ball is drawn in the position it will assume in the valve under the no load condition. The interference dimension I will vary according to the material used for the seat. It is, of course, essential that the total deflection of the lip under full load be kept within the elastic limit of the seat material. The minimum clearance dimension C between the ball and face 25f of the ring, added to the interference dimension I, is a measure of the total full load deflection. Furthermore, the internal diameter of ring 25 at the extreme inner part of lip 25c is somewhat larger than the internal diameter of the valve passage 28.

Another factor in the design of the valve is the dimension A which is the horizontal distance between the face 25g of the ring and the interior wall of the passage 28 when the ball is in closed position, as indicated in dot and dash lines in Fig. 5. This dimension is larger than the clearance dimension C, preferably by at least the radius of the lip 30a, so that the interior wall of the ball passage remains spaced from surface 25g when the valve is closed under load.

When the ball is installed in the valve, lip 25c is deflected by an amount equal to the interference dimension I. The ring then has a confined region of engagement with the ball, engaging the ball substantially tangentially to the surface of the ball at the point where the radius of rounded portion 25d merges with the straight side of the lip. The point of contact is also outside rim 30a. The direction of the force between the ring and the ball lies approximately along the radius R of the ball.

The rounded shapes and the relationship of lip portion 25d and rim 30a play an important part in the operation of the valve. Fig. 8 illustrates the relative positions of the ball and ring 25 when the valve is partly open. The left-hand portion of the ring is out of engagement with the ball which is, in effect, a truncated sphere because of passage 28. The portion of lip 25c which is out of engagement has returned to its unstressed condition, that is, it has the configuration in cross-section shown in Fig. 5. The right-hand portion of the ring, however, is still engaged and the lip around that portion will have the configuration shown in Fig. 6. Portions E and F, where the rim of the port is just entering or leaving the unstressed portion of the ring will be partially deflected. Lip 25c, because of its shape, has a graduated stiffness and the inner portion will tend to bend first and the curved rim 30a presents no sharp edges which might cut into the ring. The rim will thus tend to roll easily into and out of the lip without damaging the ring and without binding.

When the valve is fully closed, as shown in Fig. 7, surface 25g lies outside rim 30a. The ring material therefore cannot flow up into the port and cause the valve to stick, as it might if this part of the ring extended past the port.

Ring 26 is constructed exactly the same as ring 25 and port 29 has a rounded lip similar to lip 30a. Ring 26 is assembled in the same relationship to the ball as ring 25 but in the reverse position. Lip 26a is initially deflected to the right by an interference dimension equal to dimension I. If ring 26 is on the upstream side, as illustrated in Fig. 7, lip 26a will return toward its unstressed condition and thus remain in contact with the ball to seal the ball on the upstream side. It is apparent that, if the interference dimension I, by which both ring lips are initially deflected or pre-loaded, is somewhat greater than dimension C which represents the maximum travel of the ball under load, lip 26a, will remain somewhat deflected at all times and thus maintain a certain amount of mechanical pressure against the ball. The hydraulic pressure against the upstream side of lip 26a adds to the pressure resulting from the lip's preloaded condition. A tight seal on the upstream side of the ball is thus assured. When the valve is open the fluid pressure against lip 26a will not force the lip into the valve port 29 because the lip engages the ball outside the port. Port 29 furthermore has a rounded rim 29a so that no cutting of lip 26a will occur during opening and closing.

The valve is symmetrical in design and is intended for use in either direction, that is, with either ring 25 or ring 26 on the downstream side. Under no load, surface 26g is spaced from the interior wall of passage 28 by a distance A. The distance between surfaces 25g and 26g is, therefore, the internal diameter of passage 28 plus 2A.

The modified form of sealing ring 40, shown in Fig. 9, has a lip 41, similar in shape to lips 25c and 26a, and also has a second lip 42 forming, with lip 41, a V-shaped groove 43. In this form, when lip 42 has deflected sufficiently to close groove 43, lip 42 adds to the stiffness of the ring. With this form of ring the casing 20 may have an undercut 44 to permit deflection of lip 42. Ring 40 is here shown as having a reinforcing insert 45 of harder material than the ring itself.

By suitably varying the dimensions of the rings and their sealing lips, valves may be constructed with rings of various materials ranging from fairly soft material or synthetic rubbers to metals. It has hitherto been considered impractical to make a ball valve with metal seats which is sealed on both the upstream and the downstream side and can be used in either direction. With a ring of hard material the deflection of the lips is of course small. The drawings are somewhat exaggerated here for the sake of clarity.

Examples of typical values for the total deflection of the downstream lip for rings of various materials are as follows:

|  | Inches |
|---|---|
| Rubber of 80–90 Shore scale hardness | .010 to .030 |
| Molded nylon | .002 to .005 |
| Molded tetrafluoro-ethylene | .005 to .015 |
| Stainless steel | .001 to .003 |

The interference dimension I would be about half the above amounts in each case.

The allowance between faces 25g and 26g, to ensure clearance of these faces by the ports of the ball, will vary somewhat according to the material of the seat rings. With a hard material, the body of the ring will not yield to any measurable extent, so that the distance C represents the maximum travel of the ball from its no load position. Soft rings may yield to some degree so that some additional allowance has to be made for the spacing between the ring faces. The position of the point of contact between the ball and the ring lips may also be varied slightly, and the direction of the pre-load force is not necessarily exactly tangential to the ball. It is essential, however, that the point of contact be spaced away from the outer edge of the port, and the direction of force should be at an angle of at least 10° to the axis of the passage 28 when the ball is in open position.

Valves of this construction can be made liquid and gas tight on both the upstream and the downstream side under extremely high pressures. Because of the fact that hard materials, even metals, can be used for the seals, it is possible to produce valves for high temperature use, and for long wear in locations where access to the valves for repair is difficult or impossible.

What is claimed is:

1. A ball valve comprising: a casing adapted to be connected to a pipe line and having a valve chamber and inlet and outlet openings; a ball mounted in said chamber and having a cylindrical internal passage with ports at each end; a pair of sealing rings mounted on opposite sides of the ball one around each of said openings, the ball being rotatable between an open position in which said ports are centered on said rings and a closed position in which said ports are disposed between said rings, each of said rings having a lip which engages said ball around and spaced from one of said ports when the ball is in said open position said lips having inner edge portions curving away from the ball, each of said lips being free to bend in the axial direction of the respective ring and increasing in thickness from its edge portion outward in the radial direction of the respective ring, and said rings having opposed faces spaced from one another by a distance greater than the diameter of said passage.

2. A ball valve comprising: a casing adapted to be connected to a pipe line and having a valve chamber and inlet and outlet openings; a ball mounted in said chamber and having a cylindrical internal passage with ports at each end; a pair of sealing rings mounted on opposite sides of the ball one around each of said openings, the ball being rotatable between an open position in which said ports are centered on said rings and a closed position in which said ports are disposed between said rings, each of said rings having a lip which engages said ball around and spaced from one of said ports when the ball is in said open position each of said lips being free to bend in the axial direction of the respective ring and increasing in thickness outward in the radial direction of the respective ring, the lips being spaced so as to be bent by the ball when the ball is in said open position.

3. A ball valve as described in claim 2, each of said rings having an oblique face disposed toward said ball and the ball being movable in either direction under fluid pressure to seat on either of said faces and said lips being sufficiently bendable to follow the motion of and maintain contact with said ball.

4. A ball valve, for controlling flow through a pipe line, comprising: a casing assembly having inlet and outlet passageways and enclosing a valve chamber; a ball mounted in said chamber for limited movement toward either of said passageways, said ball having a passage therethrough and being rotatable between an open position, in which said passage is aligned with said passageways, and a closed position, in which said passage is out of communication with said passageways; and a pair of resilient seating rings disposed in said chamber about said passageways, one on the upstream side and one on the downstream side of said ball, each ring having a body portion and a lip projecting inwardly toward the flow axis, each lip having a flat side disposed against the ball and a bevelled side disposed away from the ball whereby the lips increase uniformly in thickness toward said body portion, the lips being flexible so as to move with and remain in contact with the ball upon its movement toward either of said passageways.

5. A ball valve as described in claim 4, said rings being so placed with respect to the ball as to produce initial pressure between said lips and the ball and thereby flex the lips.

6. A ball valve as described in claim 4, said ball having a square recess in one side centered on its axis of rotation, the recess being aligned with a diagonal parallel to said passage, and the valve being provided with a stem having a square end of substantially smaller size than said recess, engaged in said recess, the loose engagement of said end in said recess providing for said limited movement of the ball.

7. A ball valve comprising: a casing adapted to be connected to a pipe line and having a valve chamber and inlet and outlet openings; a ball mounted in said chamber and having a port; and a sealing ring mounted in said chamber around one of said openings, said ring having a lip projecting inward toward the axis of the ring and engaging the ball, said lip being free to bend in the axial direction of the ring and increasing in thickness outward in the radial direction of the ring, and said ball being rotatable between an open position in which said port is in register with the opening surrounded by said ring and a closed position.

8. A ball valve as described in claim 7, said lip having side faces disposed one toward the ball and one away from the ball, and said faces diverging from each other substantially uniformly outward in the radial direction of the ring.

9. A ball valve for controlling flow through a pipe line comprising: a casing assembly having inlet and outlet passageways and enclosing a valve chamber; a ball mounted in said chamber for limited movement toward either of said passageways, said ball having a passage therethrough and being rotatable between an open position, in which said passage is aligned with said passageways, and a closed position, in which said passage is out of communication with said passageways; and a pair of resilient seating rings disposed in said chamber about said passageways, one on the upstream side and one on the downstream side of said ball, each ring having a body portion and a lip projecting inwardly toward the flow axis, each lip increasing in thickness toward said body portion, the lips being flexible so as to move with and remain in contact with the ball upon its movement toward either of said passageways.

10. A ball valve as described in claim 9, said rings being so placed with respect to the ball as to produce initial pressure between said lips and the ball and thereby flex the lips.

References Cited in the file of this patent

UNITED STATES PATENTS

| 934,614 | Huxley | Sept. 21, 1909 |
| 2,201,895 | Glen | May 21, 1940 |
| 2,606,738 | Glen | Aug. 12, 1952 |
| 2,665,879 | Housekeeper | Jan. 12, 1954 |
| 2,792,196 | Clade | June 28, 1957 |

FOREIGN PATENTS

| 1,018,974 | France | of 1953 |